(12) United States Patent
Jenkins

(10) Patent No.: US 10,944,550 B2
(45) Date of Patent: Mar. 9, 2021

(54) OVER-THE-TOP END-TO-END INFORMATION SECURITY IN A DATA CENTER OPERATING ENVIRONMENT

(71) Applicant: Vorbi, Inc., Dallas, TX (US)

(72) Inventor: Benjamin L. Jenkins, Forney, TX (US)

(73) Assignee: Providence Interests, LLC, Plano, TX (US)

( * ) Notice: Subject to any disclaimer, the term of this patent is extended or adjusted under 35 U.S.C. 154(b) by 0 days.

(21) Appl. No.: 16/925,820

(22) Filed: Jul. 10, 2020

(65) Prior Publication Data

US 2021/0014043 A1 Jan. 14, 2021

Related U.S. Application Data

(60) Provisional application No. 62/873,484, filed on Jul. 12, 2019.

(51) Int. Cl.
*H04L 29/06* (2006.01)
*H04L 9/08* (2006.01)
*H04L 9/00* (2006.01)

(52) U.S. Cl.
CPC ............. *H04L 9/08* (2013.01); *H04L 9/006* (2013.01); *H04L 2209/12* (2013.01)

(58) Field of Classification Search
CPC ........ H04L 9/08; H04L 9/006; H04L 2209/12
See application file for complete search history.

(56) References Cited

U.S. PATENT DOCUMENTS

| 6,922,785 | B1* | 7/2005 | Brewer | H04L 63/0428 380/28 |
|---|---|---|---|---|
| 7,716,730 | B1* | 5/2010 | Droux | H04L 63/0442 726/14 |
| 2005/0114663 | A1* | 5/2005 | Cornell | G06F 21/85 713/168 |
| 2005/0201073 | A1 | 9/2005 | Pincu et al. | |
| 2006/0015781 | A1 | 1/2006 | Rothman et al. | |
| 2009/0021907 | A1 | 1/2009 | Mann et al. | |
| 2013/0283045 | A1* | 10/2013 | Li | H04L 63/162 713/160 |
| 2014/0241203 | A1 | 8/2014 | Elson | |
| 2015/0222500 | A1 | 8/2015 | Davari et al. | |

(Continued)

*Primary Examiner* — Brandon S Hoffman
*Assistant Examiner* — William A Corum, Jr.
(74) *Attorney, Agent, or Firm* — David H. Judson

(57) ABSTRACT

A technique for over-the-top end-to-end (OTT E2E) information security in a data center providing IT infrastructure for an enterprise network. The technique provides a hardware-to-hardware and/or hardware-to-software PKI over-the-top encryption method that can be applied to both hardware devices and virtual devices. The hardware side may be implemented in a customer premises-based physical enclosure (e.g., a concentrator) having multiple ports. Each port has associated therewith an integrated circuit-based NID. This device provides OSI Layer 2 encryption offloaded to a PKI processor on this chip. Preferably, this process of handling encryption is transparent, with all handling of keys occurring automatically during a device discovery operation. Each key is configured for use for the single port for which the associated device is responsible. This approach allows separate keys on each port to curtail brute force decryption; in the event of key exposure, only one port at a time can become compromised.

9 Claims, 2 Drawing Sheets

(56) References Cited

U.S. PATENT DOCUMENTS

2015/0381578 A1* 12/2015 Thota ............... H04L 63/1408
                                                    713/168
2016/0241293 A1    8/2016 Huang et al.

* cited by examiner

OVER-THE-TOP END-TO-END INFORMATION SECURITY IN A DATA CENTER OPERATING ENVIRONMENT

BACKGROUND

Technical Field

This application relates generally to information security.

Background of the Related Art

Enterprise Information Technology (IT) needs are evolving toward on-demand (e.g., cloud-based) services and infrastructure, which are housed in network-accessible data centers. A data center is a physical facility that centralizes an organization's IT operations and equipment (e.g., servers, storage hardware, cables and racks, as well as information security devices such as firewalls), as well as where it stores, manages, and disseminates its data. In addition to the IT equipment itself, a data center includes support infrastructure (e.g., UPS, environmental controls, physical security systems, and the like) to ensure high availability and other service level requirements. Data centers often house a network's most critical systems and thus are vital to the continuity of daily operations. Typically, modern data center architectures also support virtualization to optimize resource utilization and increase IT flexibility. Viewed from an external vantage point, the physical and virtual resources (including support infrastructure) within a data center are a large number of IP-based devices, each of which may be transmitting and receiving data. Such data often transits to or from the data center and thus needs to be protected.

There are many well-known techniques to secure data in transit. Public key cryptography is a cryptographic technique that enables entities to securely communicate on an insecure public network, and reliably verify the identity of an entity via digital signatures. A public key infrastructure (PKI) is a system for the creation, storage, and distribution of digital certificates which are used to verify that a particular public key belongs to a certain entity. The PKI creates digital certificates which map public keys to entities, securely stores these certificates in a central repository and revokes them if needed. Typically, a PKI comprises a certificate authority (CA) that stores, issues and signs the digital certificates, a registration authority (RA) which verifies the identity of entities requesting their digital certificates to be stored at the CA, a secure central directory in which to store and index keys, a certificate management system managing access to stored certificates or the delivery of the certificates to be issued, and a certificate policy stating the PKI's requirements concerning its procedures.

There remains a need to provide for new techniques for information security, especially with respect to data in transit in the context of a data center operating environment with large-scale IP-based deployments.

BRIEF SUMMARY

According to this disclosure, a technique for over-the-top end-to-end (OTT E2E) information security is provided, e.g., in a data center operating environment providing IT infrastructure for an enterprise network. The technique provides a hardware-to-hardware and/or hardware-to-software PKI over-the-top encryption method that can be applied to both hardware devices and virtual devices. In one embodiment, the hardware side is implemented in a customer premise-based physical disclosure (e.g., a concentrator) having multiple ports. Each of the ports has associated therewith an integrated circuit (IC)-based NID (Network Interface Device). This device provides OSI Layer 2 encryption offloaded to a PKI processor on this chip. Preferably, this process of handling encryption is transparent to an end user, with all handling of keys occurring automatically during a device discovery operation. Each key is unique and only configured for use for the single port for which the associated device is responsible. This approach allows separate keys on each port of the concentrator to curtail brute force decryption so that, in the event of key exposure, only one port at a time can become compromised.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION

Figure 1:
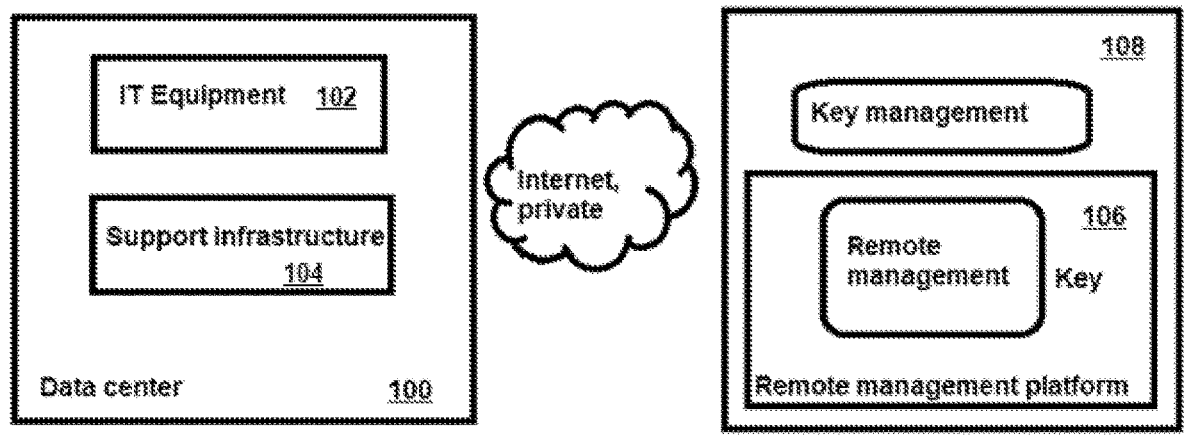
FIG. 1 depicts a high level depiction of a portion of a data center in which a concentrator device of this disclosure may be implemented.

FIG. 1 depicts a representative data center operating environment 100 in which the techniques of this disclosure may be carried out. The data center may be enterprise- or cloud-based, and access to the data center and its resources may be managed by a service provider. As noted above, typically a data center comprises a large number of IP-based resources including, without limitation, IT equipment (servers, data storage, information security devices) 102, support infrastructure (UPS, physical security systems such as IoT-based cameras, etc.) 104, and the like. In a typical use case, the data center supports a cloud computing environment.

In the example embodiment, the data center operating environment 100 is being managed in whole or in part remotely via a remote management platform 106. The remote management platform itself may be implemented in some other data center 108.

Generally, it can be assumed that all or some of the resources within the data center operating environment in FIG. 1 are generating and receiving data. Data transport to and from the operating environment typically conforms to the OSI standard seven (7) layer model. In this operating environment, it is desired to secure information in transit to and from any such IP-based resource, e.g., to and from the remote management platform 106. As one example, an IP resource is an IoT camera whose activity is being monitored by the remote management platform.

According to this disclosure, and to that end, preferably data connectivity to and from a IP-based resource in the above-described operating environment is secured using a microchip-based network interface device (NID), sometimes referred to herein as a PKI-Crypto IC device, that acts as a power source and collection source to guarantee encryption between any IP-based resource that is coupled to the device. Preferably, this NID device is implemented in a small form factor, e.g., as a pass-through module or built-in circuit, with the encryption being provided by an on-board PKI processor. A representative (but non-limiting) integrated circuit (IC) is a Model ATECC508A, available from Microchip Technology, Inc., which is a crypto engine-based authentication device with highly-secure hardware-based key storage. Other commercial IC-based devices may also be used to provide the encryption layer. An alternative embodiment implements a software-based, which may be referred to as a "crypto soft port."

Figure 2:
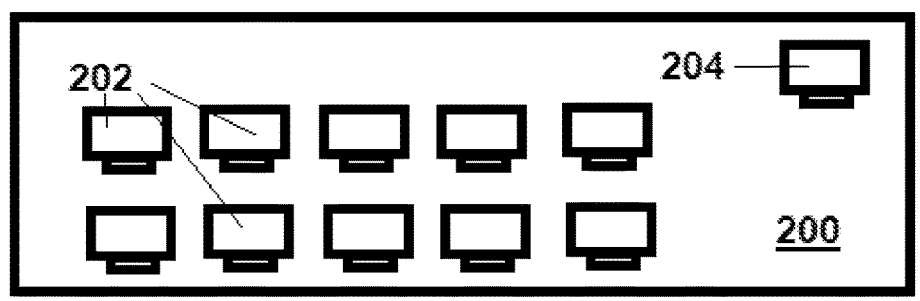
FIG. 2 depicts a front view of one embodiment of the concentrator device.

Referring now to FIG. 2, in a representative (but non-limiting) embodiment, a plurality of such devices are supported within a physical enclosure 200, such as a rack-mounted concentrator. As depicted, the enclosure supports a plurality of ports 202 (e.g., each being a interconnect port such as RJ45, optical, custom or other type). Power-over-Ethernet (PoE) may be used to power the device on a local link when configured as a pass-through. An output 204 is coupled to an external switch, such as a customer switch or router (not shown).

Figure 3:
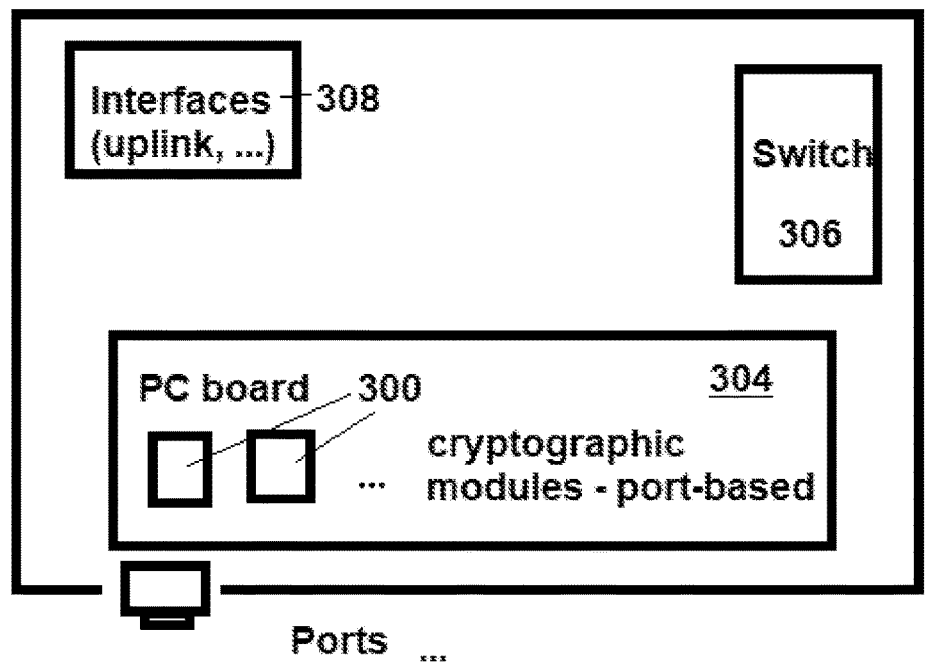
FIG. 3 depicts an internal view of the device of FIG. 2.

As shown in FIG. 3, an internal view, in this embodiment the ports are supported on a single encryption board 304 (although in practice there may be multiple such boards, perhaps one per port). The concentrator also houses an internal switch 306 coupled to the output 204 (shown in FIG. 2), as well as network interfaces 308 for uplink/downlink. Each port 202 is associated with its own microchip-based NID 300 of the type described. The PKI processor on the microchip provides OSI Layer 2 encryption; Layer 3 headers, however, are not altered. In this manner, per-port based encryption is provided. The concentrator then provides a master encryption on specific data passing through the customer switch. Preferably, this process of handling encryption is transparent to an end user, with all handling of keys occurring automatically during a device discovery operation. Each key is unique and only configured for use for the single port for which the associated device is responsible. This approach allows separate keys on each port of the concentrator to curtail brute force decryption so that, in the event of key exposure, only one port at a time can become compromised.

Figure 4:
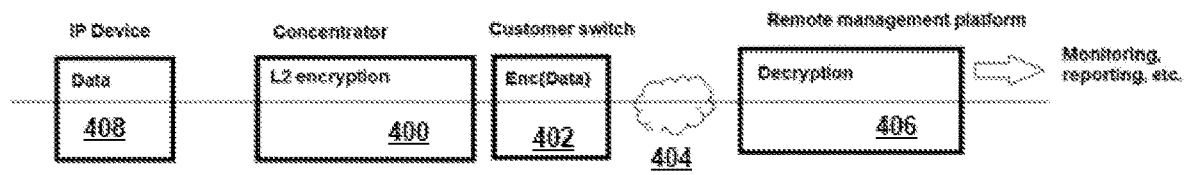
FIG. 4 depicts a physical and logical connection between an IP device in a data center and a remote management system, wherein data-in-transit between such endpoints is secured according to the techniques of this disclosure.

Physically, an IP-based device within the data center is coupled to a port 202, which as noted above has an associated NID (typically a physical endpoint) that includes an on-board or software-based encryption module (the PKI Crypto IC). As noted, and as depicted in FIG. 2, the port may comprise a port of a larger device or system, such as a concentrator, although this is not a requirement. As depicted in FIG. 4, whether a single line or multiple ports, the physical output of the concentrator 400 then couples to a customer switch/router 402, and from there typically exiting the data center to the publicly-routed Internet (or another private data network) 404. On a remote side, e.g., at the facilities of a service provider that is managing the data center remotely ("as-a-service"), typically there is a key management system (e.g., hosted by the service provider) 406, and an endpoint associated with each per-port connection provided in the concentrator. The key management system 406 manages the keys used by the concentrator.

Logically, the IP device 408 generates normal data, which data is then encrypted transparently by the NID device and delivered silently through the customer switch/router externally over the Internet to the remote location; at the remote side the encrypted data is decrypted. Data intended for the IP device likewise is encrypted on the remote side, received through the customer switch/router, and then decrypted by the NID device and delivered to the IP device. As noted, the concentrator handles the encryption per port, and then performs a master encryption on data passing the customer switch and intended for the remote management platform.

In this manner, full over-the-top end-to-end L2 encryption is provided for with respect to data-in-transit between the endpoints (namely, the IP device, on the one hand, and the remote management platform, on the other hand). The keys for the encryption preferably are managed by the remote management platform, although this key management may also be carried out in whole or in part on the customer premises. In either case, in the event a particular key (associated to a particular port) is compromised, any such compromise does not impact or effect data on the other ports, which are each protected by their own respective dedicated key(s).

The approach herein thus provides for a transparent layer designed to guarantee some level of encryption on every single packet flowing between two points that have finished a key handshake process. The notion of "transparent" here refers to the fact that the encryption is not necessarily surfaced to the end user (generally, the customer). From there, a customer may still elect to encrypt the frames (in which those encrypted packets are transported) using any technology, in which case each frame is double-encrypted.

As noted, preferably the technique is implemented as a pass-through module or a built-in circuit that contains this technology to facilitate providing the end-to-end encryption. In the embodiment shown in FIGS. 2 and 3, the {PKI-Crypto IC} is a small device powered from either PoE devices or external power source or built into the device as a discrete circuit. An internal version is a small circuit in-line with the PHY so that any PHY may be used (and not just RJ45).

The following provides additional details of a representative remote management platform that provides one or more management services for a customer data center. A remote management service may be implemented using a set of computing resources that are co-located or themselves distributed. Typically, a service is implemented in one or more computing systems. The computing platform (or portions thereof) may be implemented in a dedicated environment, in an on-premises manner, as a cloud-based architecture, or some hybrid. A typical implementation of the compute infrastructure is in a cloud-computing environment. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The remote management platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill will appreciate that some of the functions may be combined or shared in given instructions, program sequences, code portions, and the like.

The functionality may be implemented with other application layer protocols besides HTTP/HTTPS, or any other protocol having similar operating characteristics.

There is no limitation on the type of computing entity that may implement the client-side or server-side of any communication. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

What is claimed is:

1. A device, comprising:
a housing having a set of ports; and
a network interface device associated with each port of the set of ports, the network interface device comprising a cryptographic module that transparently encrypts/decrypts OSI Layer 2 (L2) headers associated with data-in-transit to/from the network interface device, the cryptographic module leaving L3 headers unaltered;
wherein each port has an associated cryptographic key that is unique such that compromise of the associated cryptographic key does not expose L2 headers associated with data-in-transit to/from any other network interface device supported in the housing.

2. The device as described in claim 1 wherein the cryptographic module is hardware-based, or software-based.

3. The device as described in claim 1 wherein the device is a concentrator.

4. The device as described in claim 1 wherein each port is coupled to an IP device that is a source or target of the data-in-transit.

5. The device as described in claim 1 wherein a port is an RJ45 or optical PoE.

6. A system, comprising:
a management platform; and
a concentrator device having a set of ports, wherein a respective port has an associated network interface device comprising a cryptographic module, wherein the cryptographic module transparently encrypts/decrypts OSI Layer 2 (L2) headers associated with data-in-transit to/from the network interface device as the data is communicated between an IP device coupled to the respective port and the management platform, the cryptographic module leaving L3 headers unaltered;
wherein each respective port has an associated cryptographic key that is unique such that compromise of the associated cryptographic key does not expose L2 headers associated with data-in-transit to/from any other network interface device supported in the concentrator.

7. The system as described as in claim 6 wherein the concentrator is located on-premises at a data center, and the management platform is located remotely from the data center.

8. The system as described in claim 7 wherein the management platform manages the associated cryptographic keys.

9. The system as described in claim 6 wherein a cryptographic module is hardware-based or software-based.

* * * * *